United States Patent
Edinger

(10) Patent No.: US 7,229,555 B1
(45) Date of Patent: Jun. 12, 2007

(54) LOW-MAINTENANCE WATERMAKER

(76) Inventor: William J. Edinger, 21 Edgewood Way, San Rafael, CA (US) 94901

( * ) Notice: Subject to any disclaimer, the term of this patent is extended or adjusted under 35 U.S.C. 154(b) by 409 days.

(21) Appl. No.: 10/767,119

(22) Filed: Jan. 28, 2004

(51) Int. Cl.
*B01D 61/00* (2006.01)
*B01D 63/00* (2006.01)
*B01D 35/06* (2006.01)
*H05F 3/00* (2006.01)
*B03C 5/00* (2006.01)
*B01D 65/02* (2006.01)

(52) U.S. Cl. ............ 210/652; 210/321.69; 210/321.74; 210/321.83; 210/636; 210/222; 204/164; 204/660

(58) Field of Classification Search ................ 210/652, 210/636, 321.74, 222, 321.69, 695, 223, 210/321.83; 204/671, 164, 186.04, 672, 204/660, 667
See application file for complete search history.

(56) References Cited

U.S. PATENT DOCUMENTS

| | | | |
|---|---|---|---|
| 5,139,695 A * | 8/1992 | Eckhardt | 252/187.24 |
| 5,203,993 A * | 4/1993 | Arbisi | 210/221.1 |
| 5,217,607 A * | 6/1993 | Dalton et al. | 210/143 |
| 5,591,317 A * | 1/1997 | Pitts, Jr. | 204/667 |
| 6,332,960 B1 * | 12/2001 | Monteith | 210/748 |
| 6,451,208 B1 * | 9/2002 | Ledoux | 210/222 |
| 6,652,715 B2 * | 11/2003 | McLaine | 204/164 |
| 6,783,687 B2 * | 8/2004 | Richard | 210/695 |
| 6,795,298 B2 * | 9/2004 | Shiue et al. | 361/508 |
| 6,913,383 B2 * | 7/2005 | Jorimann et al. | 374/31 |

* cited by examiner

*Primary Examiner*—Ana Fortuna

(57) ABSTRACT

A reverse osmosis system is subject to long periods of non-use in which water stands inside. A hollow-cylindrical spiral-wound type reverse osmosis membrane is disposed inside a cylindrical pressure vessel. An electrostatic-field generator is disposed inside the pressure vessel. A high voltage direct current source powers the electrostatic-field generator and a voltage gradient is constantly produced inside the volume of the pressure vessel. Such gradients cut through the fabric of the reverse osmosis membrane layers. The voltage to the electrostatic-field generator is kept on at all times, and prevents biofouling, even during lay-up periods. Current flow through the electrostatic-field generator is insignificant because it acts as a high-Z capacitor.

6 Claims, 2 Drawing Sheets

LOW-MAINTENANCE WATERMAKER

BACKGROUND OF THE INVENTION

1. Field of the Invention

The present invention relates to watermakers that produce fresh water from sea water, and in particular to reverse osmosis types of water desalination systems that use electrostatic water treatment to control membrane fouling.

2. Description of the Prior Art

Water filtration devices and the benefits of filtered water are widely known to the public. Filtration can span very coarse devices that merely strain out solids, to finer filters that can remove fine colloids and particulates. At the extreme end of the filtration spectrum is reverse osmosis (RO). Salt, or otherwise contaminated, water forced through an RO membrane will produce clear, fresh water permeate. Such highly purified water finds uses in semiconductor fabrication, microelectronics manufacturing, pure water beverages, pharmaceuticals, drugs, and other health products. In particular, RO can be used to desalinate seawater.

Boats can only carry limited amounts of fresh water in their holding tanks, so long voyages can be constrained by how much fresh water can be carried before having to replenish. Reverse osmosis (RO) water filtration systems have become commercially available that can convert sea water into fresh water. For example, on the Internet see, www.spectrawatermakers.com/

Prior art watermakers for boats have required special chemicals to clean and store membranes during periods of lay-up and hibernation. Such maintenance is expensive, inconvenient, and time consuming. A long period of non-use may not be planned, and the lack of preparation can precipitate problems later with fouling.

Advanced RO systems now primarily use spiral wound polyamide membranes. In a typical two-layer design, a polysulfone membrane supports a very thin skin-layer that is polymerized in-situ. These, however, are especially sensitive to fouling. Some RO systems use water softeners or chemical injection to pre-treat the incoming water and prevent scale that would otherwise foul the RO membranes.

Rodrigo F. V. Romo and M. Michael Pitts describe an electrostatic method to prevent RO membrane fouling in "Application of Electrotechnology for Removal and Prevention of Reverse Osmosis Biofouling," published in AIChE Environmental Progress, Vol. 18, No.2, Summer 1999, pp. 107–112. Other, earlier work on electrophoresis or Zeta Potential was mentioned as being done by T. M. Riddick in the 1960's. Romo, et al., describe three kinds of RO membrane fouling, e.g., crystalline, particle and colloid, and microbiological. In order for biofouling to occur, the microorganisms must attach themselves to a surface. Their paper describes using electrostatic charging of the colloids and particles in suspension to prevent aggregation and attachment that would otherwise lead to biofouling.

M. Michael Pitts describes in U.S. Pat. No. 5,591,317, issued Jan. 7, 1997, (Pitts '317), an electrostatic-field generator for water treatment. A high voltage direct current source is capacitively coupled to a volume of water. The majority of the voltage gradients are said to be generated in the water, and charge particles and colloids in the water so they repel one another.

The ZETA-ROD marketed by Zeta Corporation (Tucson, Ariz.) is a commercial implementation of the electrostatic-field generator described by Pitts '317. The prior art places such electrostatic-field generators in pipes with constant or frequent flows of water. So the treated water is constantly immersing the filters downstream.

A problem developed when such electrostatic-field generators were used in RO systems that were shut down or not operated for long periods. The treated water does not reach the RO membranes when the water is stagnant. The RO membranes foul as a result of being left stagnant too long. What is needed is an RO system that uses electrostatic-field generators in such a way that the RO membranes are constantly bathed in treated water.

SUMMARY OF THE INVENTION

Briefly, a reverse osmosis system embodiment of the present invention is subject to long periods of non-use in which water stands inside. A hollow-cylindrical spiral-wound type reverse osmosis membrane is disposed inside a cylindrical pressure vessel. An electrostatic-field generator is coaxially disposed inside the reverse osmosis membrane. A high voltage direct current source powers the electrostatic-field generator and a voltage gradient is constantly produced inside the volume of the pressure vessel. Such gradients cut through the fabric of the reverse osmosis membrane in every layer. The voltage to the electrostatic-field generator is kept on at all times, and prevents biofouling, even during lay-up periods. Current flow through the electrostatic-field generator is insignificant because it acts as a high-Z capacitor.

An advantage of the present invention is that a system is provided for controlling RO membrane fouling.

Another advantage of the present invention is that a method is provided for eliminating the use of chemicals to stabilize RO membranes during periods of non-use.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENT

Figure 1:
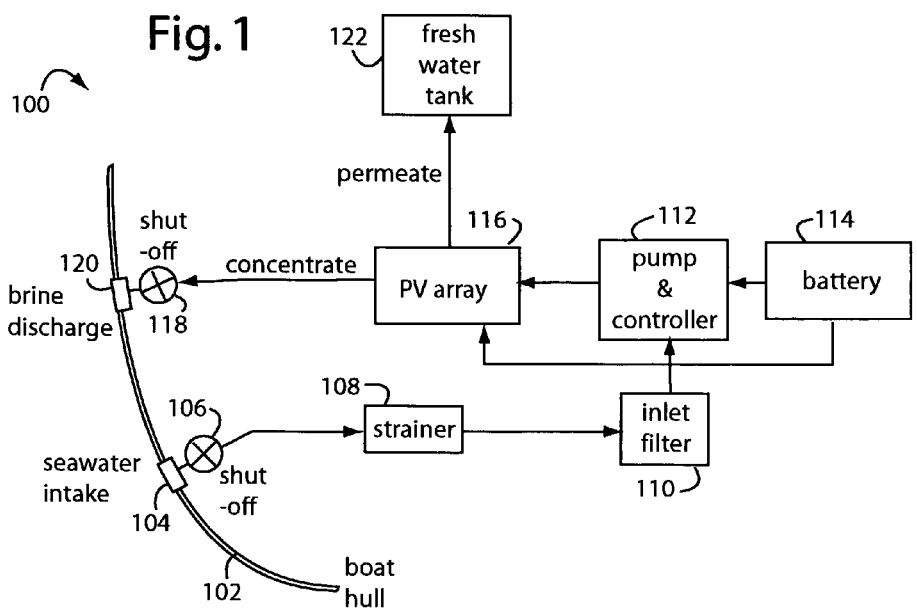
FIG. 1 is a functional block diagram of a water desalination system embodiment of the present invention installed in a boat.

FIG. 1 represents a water desalination system embodiment of the present invention, and is referred to herein by the general reference numeral 100. The water desalination system 100 here is installed in a boat with a hull 102. Seawater is input through an intake through-hull 104 and shut-off valve 106. A strainer 108 removes large debris from the input seawater, and an inlet filter 110 acts as a pre-filter and removes the finer material. A pump and controller 112 operates from a battery 114 and supplies pressurized pre-filtered water and electrostatic voltages to a pressure vessel array 116. A brine discharge flows out through a shut-off valve 118 and outlet through-hull 120. Fresh water permeate from pressure vessel array 116 is used to fill a tank 122. Water from the tank 122 can then be used, e.g., for drinking, showering, and washing.

System 100 is subject to long periods of non-use. An electrostatic-field generator is included within pressure vessel array 116 and kept operational at all times. Shore power at dock can be used with a back-up power supply that can include battery 114.

Figure 2:
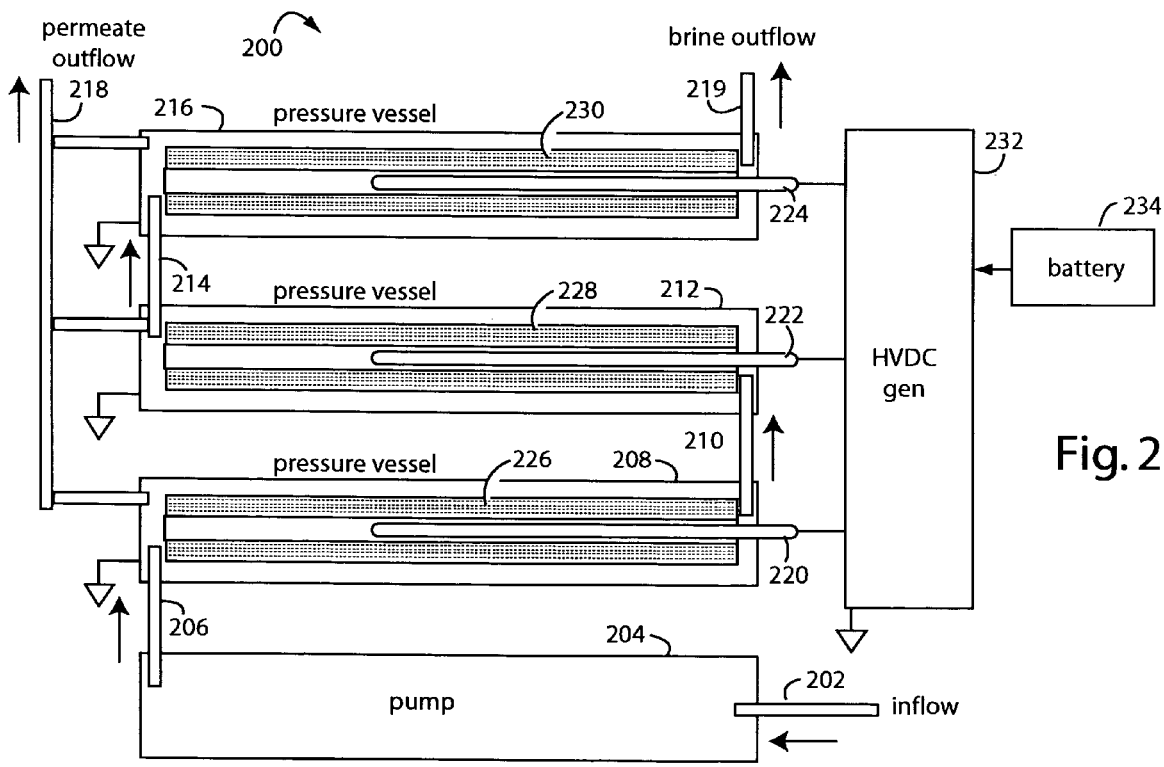
FIG. 2 is a functional block diagram of a pressure vessel array, as used in the water desalination system of FIG. 1.

FIG. 2 illustrates a three-stage pressure vessel array 200 that is useful in system 100 (FIG. 1). The pressure vessel array 200 comprises an inflow 202 of, for example, seawater. A pump 204 provides a pressurized flow through pipe connector 206 to a first pressure vessel 208. Filtered water from first pressure vessel 208 is then forwarded by a pipe connector 210 to a second pressure vessel 212. The second stage filtered water is then passed through a third pipe connector 214 to a third pressure vessel 216. A water permeate outflow 218 is potable for human consumption. A brine output 219 is discharged.

A first electrostatic-field generator electrode 220 is coaxially disposed inside the first pressure vessel 208. A second electrostatic-field generator electrode 222 is coaxially disposed inside the second pressure vessel 212. A third electrostatic-field generator electrode 224 is coaxially disposed inside the third pressure vessel 216. These are each also coaxially disposed respectively within the central cores of a first RO membrane 226, a second RO membrane 228, and a third RO membrane 230. The three electrostatic-field generator electrodes 220, 222, and 224 are powered by a high voltage direct current (HVDC) generator 232 and a battery 234. For example, 3.5 kilovolts is typical. The three electrostatic-field generator electrodes 220, 222, and 224, may be implemented with a commercial product such as the ZETA-ROD marketed by Zeta Corporation. Other similar products can be used as well.

The three electrostatic-field generator electrodes 220, 222, and 224, each generate radial voltage gradients through the water contained by their respective pressure vessels. These gradients cause particles and colloids suspended in the water immersing the RO membranes to become charged alike. The similar charges then repel one another and the particles and colloids will be electrically prevented from aggregating with one another or depositing on wetted surfaces. Such voltage gradients are therefore arranged to cut across the fabric of the respective RO membranes. This is especially valuable when spiral-wound type RO elements are used.

Figure 3:
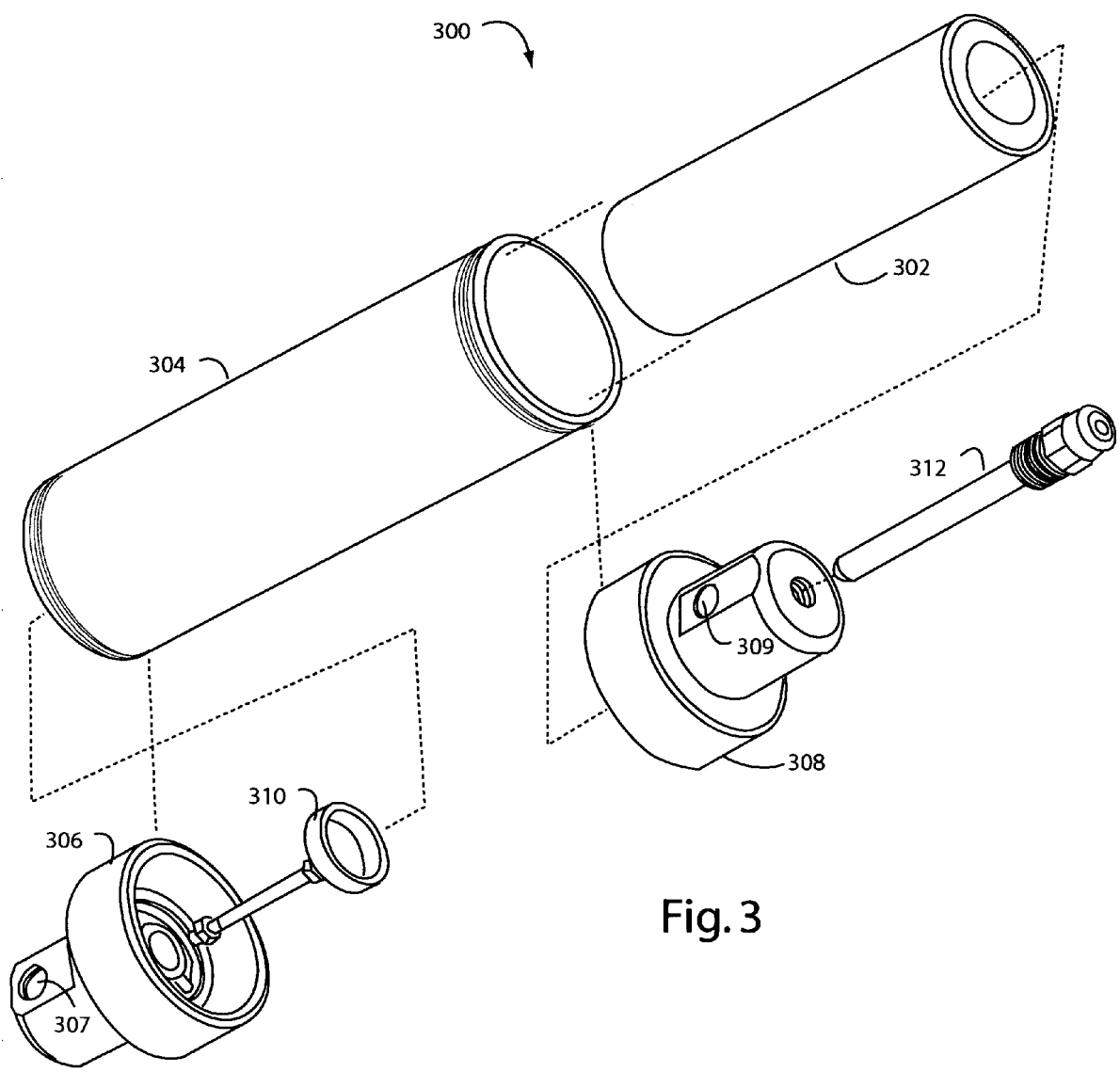
FIG. 3 is a perspective exploded assembly view of a pressure vessel as used in the system of FIG. 1 and the pressure vessel array of FIG. 2.

FIG. 3 represents a water desalination pressure vessel embodiment of the present invention, and is referred to herein by the general reference numeral 300. Pressure vessel array 300 is similar to each of the three included in pressure vessel array 200 (FIG. 2). The pressure vessel array 300 comprises a spiral-wound reverse osmosis (RO) membrane 302 that fits inside a cylindrical housing 304. The RO membrane 302 has an open central core. A pair of pressure caps 306 and 307 seal tightly to opposite ends of cylindrical housing 304 and respectively provide water outlet tap 308 and inlet tap 309. A grounding ring 310 couples to the water standing inside the pressure vessel 100, and an electrostatic electrode 312 charges the water. A high voltage DC is applied to the electrostatic electrode 312 and ground plane which appears electrically to be a high quality capacitor. So infinitesimally little electrical current ever flows. Various commercial products can be used to implement the electrostatic electrode 312, e.g., the ZETA-ROD. Surface charges are induced in colloids in the water and RO membrane 302 by applying a high voltage between the grounding ring 310 and the electrostatic electrode 312.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A water filtration system, comprising:
a pressure vessel having an inlet port and an outlet port for raw water and at least one outlet port for water permeate;
a reverse osmosis membrane disposed within the pressure vessel and providing for cross-filtering of water passing from said inlet port to said outlet port; and
an electrostatic-field generator disposed within the pressure vessel and providing for a voltage gradient that reduces biofouling of the reverse osmosis membrane.

2. The system of claim 1, wherein:
the pressure vessel is a cylinder with said inlet and outlet at opposite ends;
the reverse osmosis membrane is a spiral wound with an open central core; and
the electrostatic-field generator comprises a positive electrode and a ground disposed in said central core.

3. The system of claim 1, further comprising:
a high voltage direct current power source connected to the electrostatic-field generator.

4. The system of claim 3, wherein:
the high voltage direct current power source is such that it maintains said voltage gradient when water is standing still within the pressure vessel.

5. A method for reducing biofouling of reverse osmosis membranes, comprising:
passing water through a pressure vessel having ports for raw water and at least one outlet port for water permeate;
disposing a reverse osmosis membrane within said pressure vessel that provides for filtration of water passing from said inlet port to said outlet port; and
generating an electrostatic-field within the reverse osmosis membrane that provides for a voltage gradient inside said pressure vessel and that reduces biofouling of said reverse osmosis membrane.

6. The method of claim 5, further comprising:
maintaining said electrostatic-field during idle periods between passing water through said pressure vessel.

* * * * *